April 24, 1951   C. V. BRADY ET AL   2,550,000
BAG STRUCTURE AND PROCESS OF MANUFACTURE
Original Filed Nov. 1, 1943   3 Sheets-Sheet 1
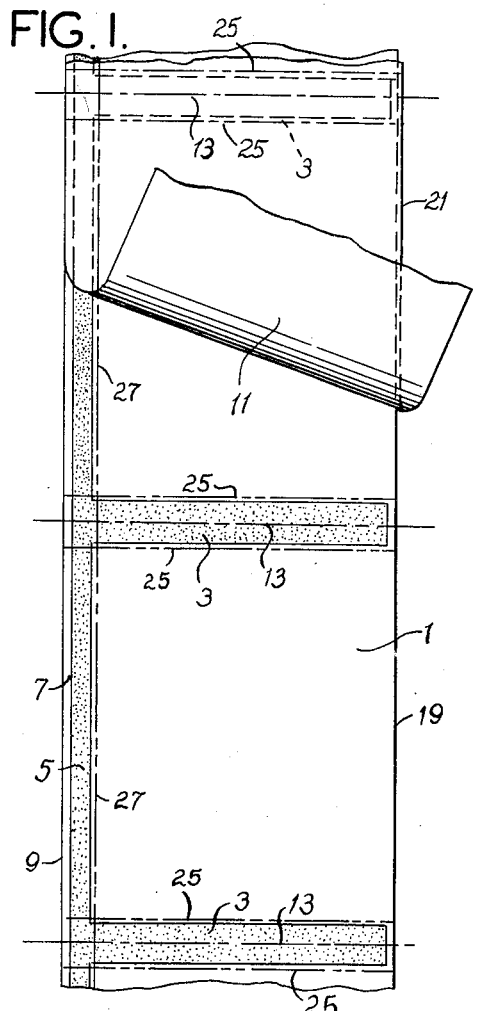
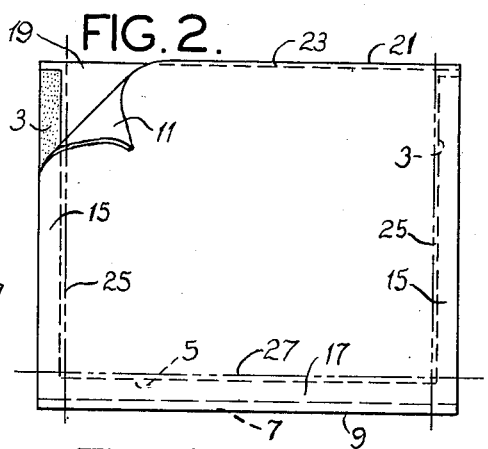
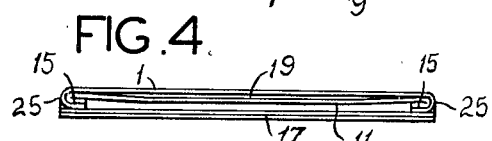
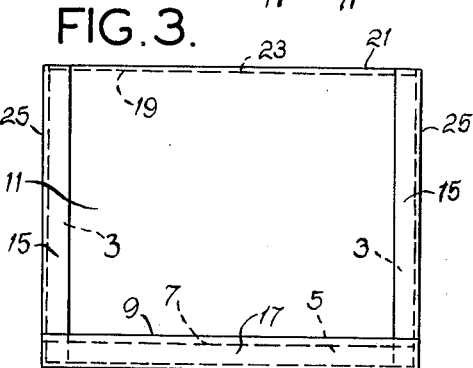
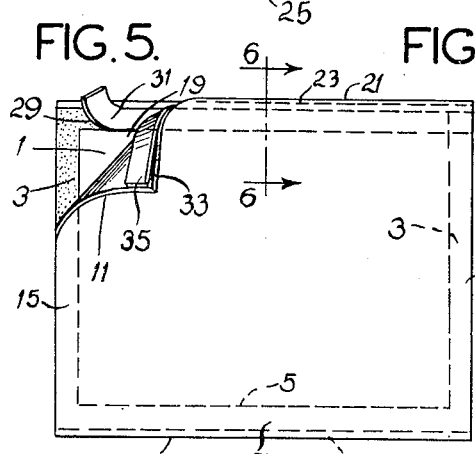
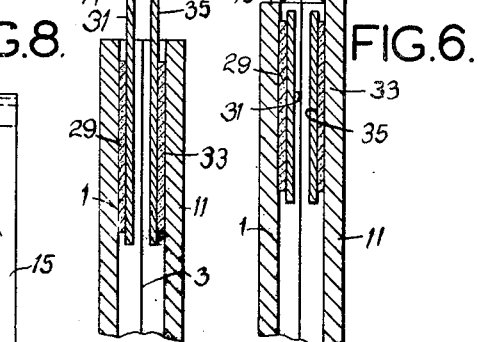
Charles V. Brady,
Russell J. Williams,
Inventors.
Haynes and Koenig,
Attorneys.

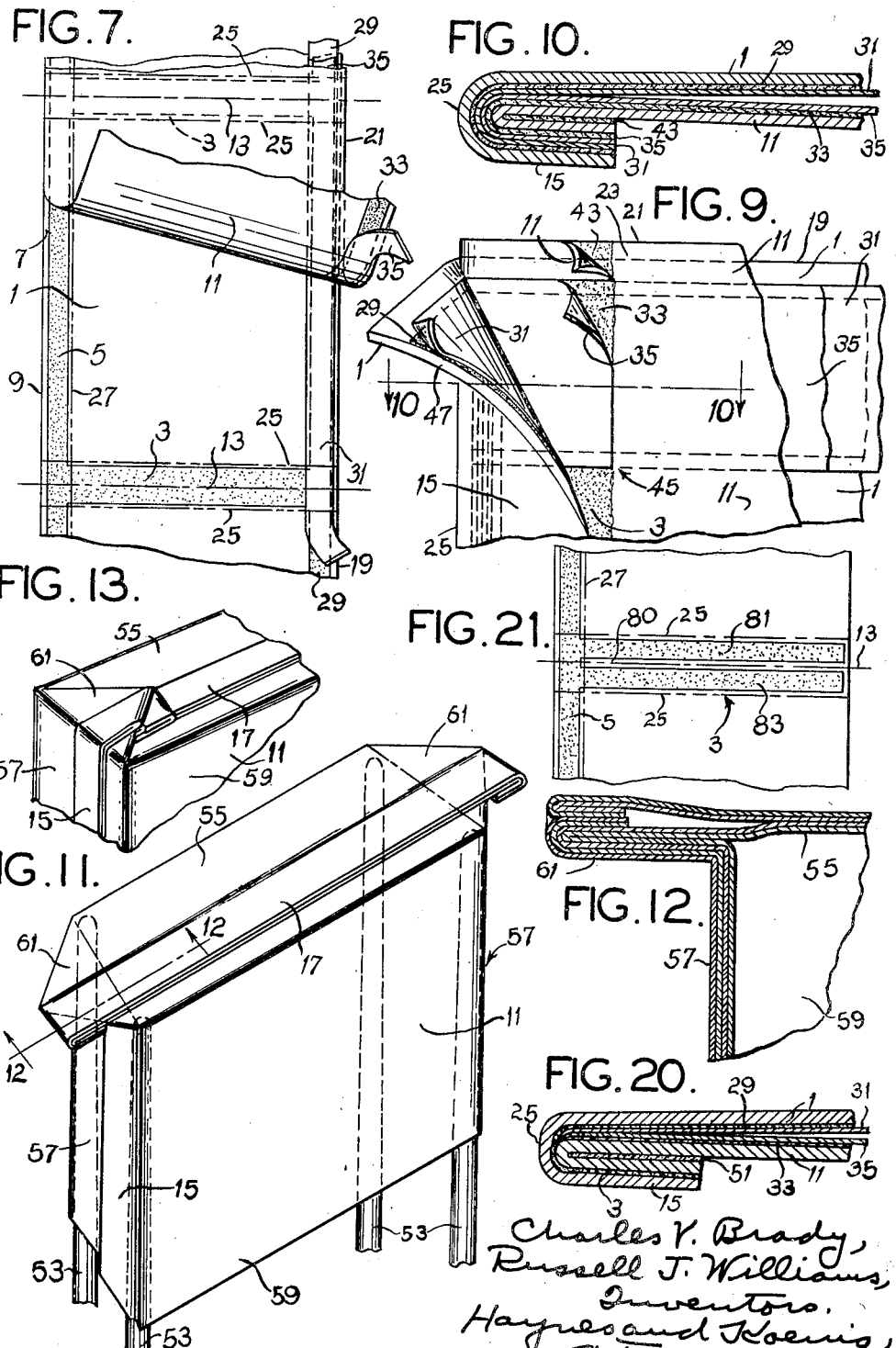

April 24, 1951
C. V. BRADY ET AL
2,550,000
BAG STRUCTURE AND PROCESS OF MANUFACTURE
Original Filed Nov. 1, 1943
3 Sheets—Sheet 3
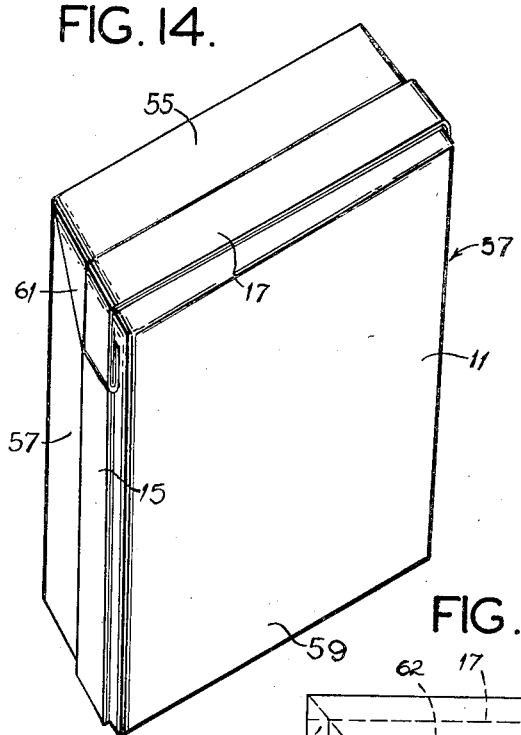
FIG. 14.
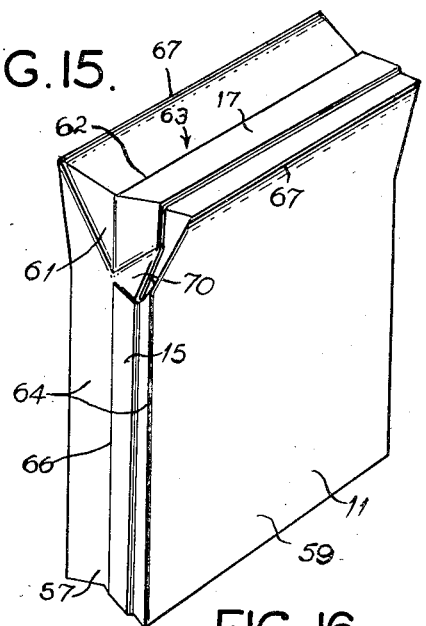
FIG. 15.
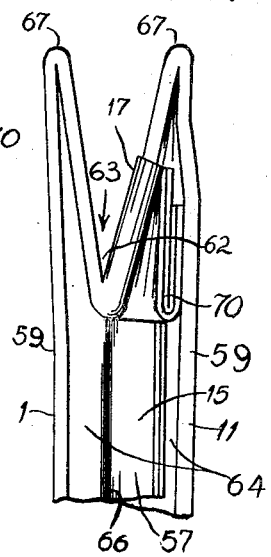
FIG. 16.
FIG. 17.
FIG. 18.
FIG. 19.
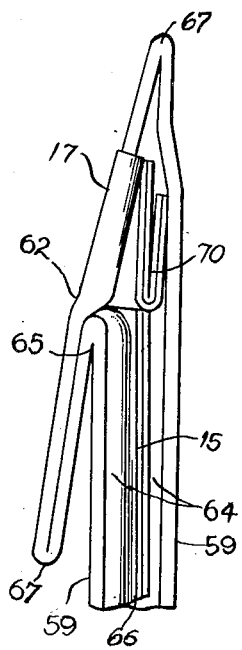
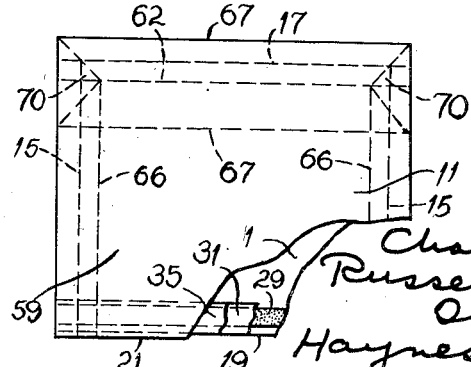
Charles V. Brady,
Russell J. Williams,
Inventors.
Haynes and Koenig,
Attorneys.

Patented Apr. 24, 1951

2,550,000

UNITED STATES PATENT OFFICE 2,550,000

BAG STRUCTURE AND PROCESS OF MANUFACTURE

Charles V. Brady, St. Louis, and Russell J. Williams, Richmond Heights, Mo., assignors to Bemis Bro. Bag Company, St. Louis, Mo., a corporation of Missouri Original application November 1, 1943, Serial No. 508,534. Divided and this application October 15, 1945, Serial No. 622,268

6 Claims. (Cl. 229—57)

This invention relates to bag structures and their methods of manufacture, and with regard to certain more specific features to flat bag structures which may also be used as case or bag liners or the like.

This application is a division of our copending application Serial No. 508,534, filed November 1, 1943, for Bag Structures and Process of Manufacture, eventuated as Patent No. 2,409,100, dated October 8, 1946.

Among the several objects of the invention may be noted the provision of a bag structure which lends itself to economical mass production methods; the provision of a bag structure of the class described which with only minor modifications in the manufacturing operation will form bags which are to be closed in the ordinary way of those which are to be pressure or heat sealed; and the provision of a bag structure of the class described adaptable to various bottom forms, such as satchel bottoms, V-bottoms and the like. Other objects will be in part obvious and in part pointed out hereinafter.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

In the accompanying drawings, in which are illustrated several of various possible embodiments of the invention, Fig. 1 is a fragmentary plan view of an intermediate composite web product with one web stripped back;

Fig. 2 is a view similar to Fig. 1 but showing a final bag-like article after segmentation of the intermediate product shown in Fig. 1;

Fig. 3 is a view similar to Fig. 2 showing a possible succeeding step;

Fig. 4 is a top edge view of Fig. 3;

Fig. 5 is a view similar to Fig. 2 showing an alternative product;

Fig. 6 is an enlarged vertical section taken on line 6—6 of Fig. 5;

Fig. 7 is a view similar to Fig. 1 but illustrating the intermediate product used to produce the construction of Figs. 5 and 6;

Fig. 8 is a view similar to Fig. 6 but showing a modification thereof;

Fig. 9 is a detailed view of a bag corner structure in which certain features of Figs. 3 and 5 are combined;

Fig. 10 is a horizontal section taken on line 10—10 of Fig. 9;

Fig. 11 is a perspective view showing how the products of my invention may be manipulated to form a bottom;

Fig. 12 is an enlarged section taken on line 12—12 of Fig. 11;

Fig. 13 shows certain bottom corner tabs produced in Fig. 11 bent upward against the bottom of the bag;

Fig. 14 is a view similar to Fig. 12 but showing said corner tabs bent down against gusset-forming portions of the bag;

Fig. 15 is a view similar to Fig. 14 but showing a preliminary step in making gussets for a V-bottom bag;

Fig. 16 is an enlarged edge view showing an almost completed V-bottom;

Fig. 17 is a face view (reduced in size) of a bag showing a finished bag employing said V-bottom;

Fig. 18 is a view similar to Fig. 16 but showing a satchel bottom;

Fig. 19 is a view similar to Fig. 17 but showing a bag with the satchel bottom of Fig. 18;

Fig. 20 is a view similar to Fig. 9 but showing a modified closure construction; and, Fig. 21 is a fragmentary view of a portion of Fig. 1 showing a modified construction.

Similar reference characters indicate corresponding parts throughout the several views of the drawings. All figures are diagrammatic, thicknesses of material being exaggerated for clarity.

In the copending United States patent application of Russell J. Williams, Serial No. 507,961, filed October 28, 1943, for Laminating Apparatus and eventuated as Patent No. 2,382,930, dated August 14, 1945, there is disclosed mechanical apparatus for manufacturing an intermediate laminated web product, the latter forming part of the subject-matter of the invention herein.

Referring now more particularly to Fig. 1, there is shown at numeral 1 a web, preferably of paper, although it may be made of fabric or other similar bag-forming material. Imprinted on this web are spaced laterally located adhesive bars 3. These are joined at one side (which will become the bottom side of a bag) by a continuous bottom-forming stripe of adhesive 5. Stripe 5 is slightly spaced from the edge 9 of web 1 as indicated at 7.

Pressed against the web 1 is a second web of paper or the like 11, which adheres at the adhesive areas 3 and 5, thus forming a composite web having a sequence of U-shaped adhesive areas. These form pockets between the webs.

Next the composite web is cut at lines 13 which pass through the bars 3. If desired, an unpasted area 80 may be left in each bar 3 where the line of severance 13 is to come, such as indicated in the fragmentary view of Fig. 21. This, in effect, separates the composite bar 3 into two portions on each side of the line of severance 13.

The above results in the bag or bag-like pocket structure along the lines shown in Fig. 2, having pasted side seams 15 and a bottom seam 17. Fig. 2 is based upon the specific form of Fig. 1. Due to the relatively narrow width of the webs 1 and 11, this structure is more or less pillow-shaped, having side seams 15, a bottom seam 17 and an open mouth at the edge 19. By having provided an offset between the edges 19 and 21 of the webs 1 and 11 respectively, there is produced the offset indicated at 23 in Fig. 2. This offset allows the mouth of the bag to be opened more readily. One corner of the pillow-shaped bag of Fig. 2 is shown opened to indicate the structure.

It is to be understood that the webs 1 and 11 during manufacture of the composite webbing shown in Fig. 1 are withdrawn from rolls and brought together continuously as indicated for example in said Patent 2,382,930 above-mentioned. Each web may be single-ply or multi-ply, treated or untreated.

The adhesive may be any of various types, depending upon the service to which the bag is to be put, for example, asphalt which remains flexible and tacky, dextrine, other thermo-plastics, or the like. As will be shown, pressure or heat sealing adhesives are preferable in certain instances.

It is intended that the pillow-shaped bag, pocket, or case liner indicated in Fig. 2 be used per se in certain instances, but usually it will be desirable to increase seam strength. For this purpose score lines 25 are provided within the side seams 15 and score line 27 within the bottom seam 17. The scoring is preferably done on the composite web as indicated at the top of Fig. 1 after the two webs 1 and 11 have been brought together but before they are segmented along the lines 13. This may be done as indicated in said patent application 507,961, now Patent No. 2,382,930. Or, scoring may be done after segmentation but it is not as economical. The seams 15 are turned on the score line 25 toward the body of the bag, and seam 17 is then turned up toward said body and over the side seam ends. Adhesive may be inserted between the folded-over seam portions 15 and 17 on the one hand and the adjacent bag wall on the other hand, thereby maintaining the folded relationship shown in Figs. 3 and 4. Thus increased seam strength is obtained. In addition, contact is inhibited between the material carried in the bags and the adhesive in the seams. Adhesive is not necessary to maintain the folded relationship when the envelope of Figs. 3 and 4 is used as a liner in an outside covering bag or envelope.

It is intended that the open mouth of the bag in Figs. 2, 3 and 4 be closed in the ordinary way after the bags are filled.

In Figs. 5-8 a modification is shown. In these figures numerals that correspond to the elements above-mentioned are the same. But in this case an added stripe of adhesive 29 is provided near the edge 19 of web 1, and before application of web 11 is covered with a protective tape 31 (Fig. 7). Then, before bringing the web 11 against the web 1, said web 11 is also provided with a stripe of adhesive 33 and covered with a tape 35. Stripes 29, 33 and tapes 31 and 35 become coplanar or opposite. Hence, when the webs are organized so as to adhere them at the adhesive regions 3 and 5, the stripes 29 and 33 are prevented by the tapes 31 and 35, respectively, from adhering. The tapes 31 and 35 are segmented along with the segmentation of the webs 1 and 11, as indicated in Fig. 5. The result is a bag structure in which the side seams 15 and 17 function as before but within the open mouth are two stripes 29 and 33 of adhesive which are protectively covered by the segments of the tapes 31 and 35 respectively. This condition is indicated in Fig. 6.

Thus the bag may be filled without damaging or interference from the adhesive under the tape. Thereafter the tape may be ripped out manually, it being understood that the adhesive (for example, asphalt) will remain tacky enough to permit this. Then the opposite sides of the bag mouth are pressed together and the tacky or pressure-sensitive adhesive will cause the stripes 29 and 33 to adhere, thus closing the mouth of the bag by mere pressure after filling.

It will be noted that the ends of the tapes 31 and 35 may be gotten hold of at the open bag corners because these corners are also protected against adhesion during the time that the tapes are in place. Thereafter, the corners, like the remainder of the striped portions 29 and 33 will adhere by pressure, thus completing the desired peripheral seal.

In Fig. 8 is shown a modification in which, instead of providing the offset 23 between the edges 21 and 19 of the web, as indicated in Fig. 6, an offset 37 is provided between the edges 39 and 41 of tapes 35 and 31 respectively. Thus the bag mouth may be more readily opened preparatory to filling, while at the same time the extensions for providing the offset are handy in removing the tape preliminary to final closure.

In Figs. 9 and 10 is shown how the construction of Figs. 3 and 4 becomes modified when the tapes 31 and 35 are used. Fig. 9 shows a corner at one of the side seams 15, which are in this case presumed to be folded over according to the teaching of Figs. 3 and 4. After filling of the bag the corner portions 47 of the seams 15 may be laid back (the tackiness of the adhesive admitting this) so that the contained tapes 31 and 35 may be removed by ripping them out along with the removal of the remainder of them. Then by pressing back the mouth portions (including the corner portions) after removal of the tape, the mouth becomes sealed shut. As an alternative, the adhesive 43 which may be used between the folded-over seam and the adjacent bag wall may be stopped off at 45 to permit easier manipulation in withdrawing the tapes at the corners. It is to be understood that, when the adhesive 43 is not used within the folds 25 and 27, the product is used as a bag-like liner to be used in other bags or casings which hold the folds in place.

The tapes 31 and 35 may be omitted without omitting the stripes 29 and 33 of adhesive, if the adhesive is of the heat-sealing variety or, for example, dried glue which may be wetted prior to final bag closure after filling. Selection in this respect depends upon the character of the bag contents, strength of seams desired, and the like. The intent is to have a protected adhesive in the bag mouth or one which requires no protection during the bag filling operation.

Fig. 20 shows a different form of corner in which the side seams 15 are pasted down up to the mouth of the bag as indicated at 51. In this case the tapes 31 and 35, along with the adhesive stripes 29 and 33, are limited in length to lie only within the score lines 25. In this event the tape cannot be applied as indicated in Fig. 7, but is segmented beforehand and applied to the webs in the desired positions between bars 3.

In Figs. 11-19 are shown various exemplary methods by means of which the bag forms shown in Figs. 3, 4, 9, 10 and 20 may be made up into V-bottom and satchel-bottom bags. The general method is that shown in the United States patent of Russell J. Williams, No. 2,381,850, dated August 7, 1945, for Methods of Making Bag Bodies, but modified to suit the basic bag above described.

Referring to Fig. 11, spreader sticks 53 are introduced into an inverted bag body and moved outwardly from one another so as to stretch the body into a parallelepiped. This temporarily forms a flat bottom 55, two flat sides 57 and flat walls 59. The result is that triangular-shaped ears 61 extend from the plane of the bottom 55. These are either turned over and against the bottom and adhered as shown in Fig. 13, or they are turned downward against the sides 57 as shown in Fig. 14. Thereafter the bottom may be treated either as shown in Figs. 15-17 or as indicated in Figs. 18-19.

As an example of subsequent treatment the case will be taken of the ears bent down as in Fig. 14. Referring first to the form of Fig. 15, the V-bottom is shown. For making this, a crease 63 is applied which in effect gussets the bottom of the bag, which in these figures is shown upside down. Side gussets 64 are also formed. The crease 62 at the bottom of the gusset 63 and the crease 66 at the bottom of the gusset 64 are coplanar and these creases form the lines of support for the edge folded-over portions 17 and 15. When the bag is flattened out as shown in Figs. 16 and 17 the folded-over portions 15 and 17 are sandwiched in the gussets. It is to be noted that the small triangular portion 70 shown in Fig. 15, when the bag is flattened out as shown in Fig. 16, folds within the side gusset 64 as shown.

If it is preferred to have the satchel-bottom type of bag, then the bottom, instead of being gusseted, is treated as shown in Figs. 18 and 19, a crease being inserted at 65, which permits laying the bottom out more or less flatly as shown in said Figs. 18 and 19. It will be observed that edges 67 in the case of Figs. 18 and 19, instead of being together, as in Figs. 16 and 17, are separated, one of them lying against a side 59 of the bag. In the case of Figs. 18 and 19 the seams 15 are again sandwiched in the side gussets 64 but the seam 17 lies flat against the open part of the flat bottom as indicated. The V-bottom or satchel-bottom may be employed either with the tabs or ears 61 folded against the bottom or against the sides. If the tabs 61 are folded up as shown in Fig. 13 before proceeding through the steps of Figs. 16-19, then these tabs do not appear in the side gussets but in the V-bottom (in the case of Fig. 16) and on the flat satchel bottom (in the case of Fig. 18). This alternative development has not been shown in detail in the drawings because it is obvious from the above what differences would occur. In any event, placing these tabs in the side gussets has the advantage that the bottom seam is positively held flat against a part of the bottom by the anchoring effect at each seam end by the respective tab held in the respective side gusset (see Figs. 16 and 18).

The terms bag, bag-like structure, case liner, envelope and pocket are to be taken as equivalents herein. So also are the terms scoring and creasing. The terms adhesive and paste are also equivalently used.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A method of making a flat bag comprising pasting together flat front and rear walls by means of flat side and flat bottom seams having continuous junctures, spreading the resulting pocket from the inside to form stretched substantially flat sides and a stretched substantially flat closed bottom from which extend said flat seams respectively, said bottom as a result having extending endwise tabs containing said junctures, folding the bottom seam against the bottom and the tabs against the sides respectively, forming inwardly angled gussets in the sides with the side seams joined to the inner angles of the gussets and sandwiched therein and with said folded tabs anchored in the gussets to hold the bottom seam in place against the bottom, and arranging the parts of the plane of the bottom which are on opposite sides of the bottom seam to assume positions substantially flatwise with respect to the plane of the bag.

2. A method of making a flat satchel-bottomed bag comprising pasting together flat front and rear walls by means of continuous flat side and flat bottom seams, spreading the resulting pocket from the inside to form stretched substantially flat sides and a stretched substantially flat closed bottom from which extend said flat seams respectively, said bottom as a result having extending endwise tabs containing said junctures, folding the bottom seam against the bottom and the tabs against the sides respectively, forming inwardly angled gussets in the sides thus spread with the side seams joined to the inner angles of the gussets and sandwiched therein and with said folded tabs anchored in the gussets to hold the bottom seam in place against the bottom, and arranging the parts of the plane of the bottom which are on opposite sides of the bottom seam to assume a flat satchel-bottom shape substantially flatwise with respect to the plane of the bag.

3. A method of making a flat gusset-bottomed bag comprising pasting together flat front and rear walls by means of continuous flat side and flat bottom seams, spreading the resulting pocket from the inside to form stretched substantially flat sides and a stretched substantially flat closed bottom from which extend said flat seams respectively, said bottom as a result having extending endwise tabs containing said junctures, folding the bottom seam against the bottom and the tabs against the sides respectively, forming inwardly angled gussets in the sides thus spread with the side seams joined to the inner angles of the gussets and sandwiched therein and with said folded tabs anchored in the gussets to hold the bottom seam in place against the bottom, and arranging the parts of the plane of the bottom area on opposite sides of the bottom seam to assume a V-shape, the sides of which are substantially flatwise with respect to the plane of the bag.

4. A bag comprising an initially flat envelope consisting of a pair of generally rectangular sheets secured together flatwise continuously along three of their four margins by adhesive and thereby having flat side and bottom seams, said envelope being creased and formed to have side gussets and a bag bottom with the flat side seams of the envelope sandwiched in the gussets, and the flat bottom seam folded over flatwise against the bag bottom, the bottom corners of the envelope where the side seams meet the bottom seam being folded over and tucked into the side gussets so as to anchor the bottom seam in its flat position against the bag bottom.

5. A bag comprising an initially flat envelope consisting of a pair of generally rectangular sheets secured together flatwise continuously along three of their four margins by adhesive and thereby having flat side and bottom seams, said envelope being creased and formed to have side gussets and a V-shaped bag bottom with the flat side seams of the envelope sandwiched in the gussets, and the flat bottom seam sandwiched in and folded over flatwise against the V-shaped bag bottom, the bottom corners of the envelope where the side seams meet the bottom seam being folded over and tucked into the side gussets so as to anchor the bottom seam in its flat position against the bag bottom.

6. A bag comprising an initially flat envelope consisting of a pair of generally rectangular sheets secured together flatwise continuously along three of their four margins by adhesive and thereby having flat side and bottom seams, said envelope being creased and formed to have side gussets and a satchel bag bottom with the flat side seams of the envelope sandwiched in the gussets, and the flat bottom seam folded over flatwise against the satchel bag bottom, the bottom corners of the envelope where the side seams meet the bottom seam being folded over and tucked into the side gussets so as to anchor the bottom seam in its flat position against the satchel bag bottom.

CHARLES V. BRADY.
RUSSELL J. WILLIAMS.

REFERENCES CITED

The following references are of record in the file of this patent:

UNITED STATES PATENTS

| Number | Name | Date |
|---|---|---|
| 407,814 | Burdick | July 30, 1889 |
| 775,268 | Flowers | Nov. 15, 1904 |
| 1,848,709 | Gurwick | Mar. 8, 1932 |
| 1,800,143 | Hughes | Apr. 7, 1931 |
| 2,290,564 | Krueger | July 21, 1942 |
| 2,381,850 | Williams | Aug. 7, 1945 |
| 2,392,206 | Waters | Jan. 1, 1946 |
| 2,395,077 | Southwick | Feb. 19, 1946 |
| 2,476,325 | Rowe | July 19, 1949 |

FOREIGN PATENTS

| Number | Country | Date |
|---|---|---|
| 521,907 | Great Britain | June 4, 1940 |